United States Patent Office 2,761,354
Patented Sept. 4, 1956

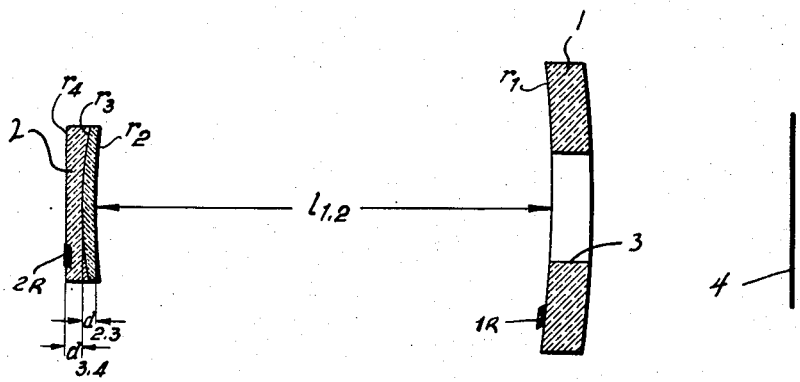

2,761,354

CASSEGRAIN MIRROR LENS OBJECTIVE

Kurt Steglich, Berlin-Spandau, Germany, assignor to Askania-Werke A. G., Berlin-Friedenau, Germany, a corporation of Germany Application April 19, 1954, Serial No. 424,205

Claims priority, application Germany April 24, 1953

3 Claims. (Cl. 88—57)

This invention relates to Cassegrain mirror lens objectives. It improves objectives of this type as to image contrast and sharpness while preserving excellent aplanatic and achromatic conditions and the other features of such an objective, with the use of spherically ground mirror and lens elements.

Heretofore, Cassegrain mountings required refracting elements, both for the primary, spherical positive mirror and the secondary, spherical, negative mirror, in order to provide adequate aplanatic and achromatic correction. Some of the correction elements had to be axially separated from one another or from the basic elements. Spherical and chromatic aberrations were thus corrected but disturbing glass surface reflections were occasioned by the same correcting elements; both by those of the objective, interposed between primary and secondary mirror surfaces and those, if any, interposed between secondary mirror and picture surfaces. Strong cones of stray light were brought into the picture by such reflections, from the primary and/or secondary mirror glass surfaces, causing haziness and lack of contrast.

The object of the present invention is, to remedy this situation so far as possible.

Upon a close analysis of the problem I have found that the number of exposed and reflecting glass-air interfaces of the entire objective system can be reduced to a single one, without loss of aplanatic and achromatic qualities, by proper choice of glass for the remaining lens elements; said lens elements forming part of the secondary mirror, whereas the primary mirror is a plain surface mirror, that is, a mirror without any glass in front of its mirror surface.

The details will be understood from the disclosure of a preferred example, which is diagrammatically illustrated in the sole figure appended hereto.

A primary plain surface mirror 1 is provided, with a positive, spherically ground, front surface $r_1$ having a reflecting layer 1R thereon, which directly reflects the light, received from the left, toward a secondary lens mirror 2. The latter consists in a pair of lenses which are cemented together, that is, not axially spaced apart from one another. The front lens has a spherically ground front surface $r_2$, concave to the incoming light and separated from the primary mirror surface by a suitable distance $l_{1,2}$. It shares with the back lens a spherically ground surface $r_3$, concave to the incoming light. The back surface $r_4$ of the back lens is spherically ground to a long radius, with focal power opposite the focal power of $r_1$, $r_2$ and $r_3$, and has a reflecting layer 2R thereon. Thus the surface $r_4$, remote from the main mirror 1, serves as secondary mirror surface, and the light passes twice through the lenses $r_{2,3}$ and $r_{3,4}$ which have, respectively, axial thicknesses $d_{2,3}$ and $d_{3,4}$. It then passes through the conventional center hole 3 of the primary mirror 1 to a photographic medium (film or plate) 4.

A skilled computer can vary the numerical data of the system, depending on focal requirements, glasses available, etc. A preferred example is as follows:

$$F = 1 : 6.3 \qquad f = 1.00$$

| Glass | | Radius | Thickness or Separation |
|---|---|---|---|
| $N_e$ | V | | |
| mirrorized | | $r_1 = -1.170$ | $l_{1,2} = 0.297$ |
| 1.6465 | 48.0 | $r_2 = -0.669$ | $d_{2,3} = 0.01$ |
| 1.5148 | 60.0 | $r_3 = -0.220$ | $d_{2,3} = 0.01$ |
| mirrorized | | $r_4 = +3.973$ | |

I claim:

1. A telescope objective, with generally Cassegrainian mounting and with lens mirror correction, substantially consisting in a primary plain mirror and a secondary cemented lens doublet mirror, for high achromatic and aplanatic correction and maximum suppression of stray reflection; the primary mirror having a central aperture and a reflector surface of spherical form with positive focal power about the aperture for forming a real image and having plain first surface construction so that no stray reflection occurs at the primary mirror; the secondary lens mirror having lens and reflector elements all of which are spherically ground and which together provide negative focal power adapted to transmit the image through the central aperture, while also providing aplanatic correction of the image, said elements of the secondary lens mirror consisting in an achromatically corrected doublet of glasses cemented together all surfaces of which glasses are spherically ground and one surface of which doublet is most remote from the primary mirror and is mirrorized to provide the reflector element, whereby only a minimum of stray reflection occurs at the secondary mirror.

2. A telescope objective with generally Cassegrainian mounting and with lens mirror correction, substantially consisting in a primary plain mirror and a secondary lens mirror; the primary plain mirror having a central aperture and a reflector surface of spherical form with positive focal power about the aperture for forming a real image and having plain reflector construction without any refracting element in front of the reflector surface; the secondary lens mirror having lens and reflector elements all of which are spherically ground and which together provide negative focal power adapted to transmit the image through the central aperture, while also providing aplanatic correction of the image, said lens elements of the secondary mirror consisting in a doublet of glasses cemented together and arranged as front and back glasses relative to the primary mirror, said front and back glasses having respectively high and low refraction indices such as approximately 1.650 and 1.500 and low and high dispersion numbers such as approximately 48 and 60, all surfaces of the glasses being spherically ground and the back surface of the back glass being mirrorized to provide the reflector element, whereby achromatic and aplanatic correction is provided and stray reflections are avoided at the primary mirror and minimized at the secondary mirror.

3. An objective as claimed in claim 1, having the following numerical data:

$$F = 1:6.3 \qquad f = 1.00$$

| Glass | | Radius | Thickness or Separation |
|---|---|---|---|
| $N_e$ | V | | |
| mirrorized | | $r_1 = -1.170$ | $l_{1,2} = 0.297$ |
| 1.6465 | 48.0 | $r_2 = -0.669$ | $d_{2,3} = 0.01$ |
| 1.5148 mirrorized | 60.0 | $r_3 = -0.220$ $r_4 = +3.973$ | $d_{2,3} = 0.01$ | wherein F is the relative aperture, f is the focal length of the objective, $N_e$ is the refraction index, V is the dispersion number, $r_1$ is the radius of curvature of the primary mirror, $r_2$ and $r_3$ are respectively the radii of front and back curvatures of the front lens of the lens mirror, $r_3$ and $r_4$ are respectively the radii of front and back curvatures of the back lens of the lens mirror, $l_{1,2}$ is the axial separation of the primary mirror from the front of the secondary mirror, $d_{2,3}$ is the thickness of the front lens of the secondary mirror and $d_{3,4}$ is the thickness of the back lens of the secondary mirror.

References Cited in the file of this patent

UNITED STATES PATENTS

| 1,967,214 | Acht | July 24, 1934 |
| 2,685,820 | Kaprelian | Aug. 10, 1954 |

FOREIGN PATENTS

| 82,671 | Germany | Aug. 7, 1895 |
| 426,539 | Great Britain | Apr. 4, 1935 |
| 754,943 | Germany | Oct. 13, 1952 |